(12) United States Patent
George

(10) Patent No.: US 7,266,576 B2
(45) Date of Patent: Sep. 4, 2007

(54) CIRCUITS AND METHODS FOR IMPLEMENTING APPROXIMATIONS TO LOGARITHMS

(75) Inventor: Richard V. George, Endicott, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 753 days.

(21) Appl. No.: 10/329,192

(22) Filed: Dec. 24, 2002

(65) Prior Publication Data

US 2004/0122878 A1 Jun. 24, 2004

(51) Int. Cl.
*G06F 1/02* (2006.01)

(52) U.S. Cl. .................................... 708/277
(58) Field of Classification Search ........... 708/277
See application file for complete search history.

(56) References Cited

U.S. PATENT DOCUMENTS

| | | | |
|---|---|---|---|
| 4,078,250 A | 3/1978 | Windsor et al. | |
| 4,583,180 A | 4/1986 | Kmetz | |
| 5,359,551 A * | 10/1994 | Pickett | 708/270 |
| 5,365,465 A | 11/1994 | Larson | |
| 5,570,310 A * | 10/1996 | Smith | 708/277 |
| 5,600,581 A | 2/1997 | Dworkin et al. | |
| 5,629,884 A | 5/1997 | Pan et al. | |
| 5,642,305 A | 6/1997 | Pan et al. | |
| 5,703,801 A | 12/1997 | Pan et al. | |
| 5,801,974 A | 9/1998 | Park | |
| 5,831,878 A | 11/1998 | Ishida | |
| 5,951,629 A | 9/1999 | Wertheim et al. | |
| 6,289,367 B1 * | 9/2001 | Allred | 708/277 |
| 6,549,924 B1 * | 4/2003 | Miller, Jr. | 708/270 |
| 6,711,601 B2 * | 3/2004 | Inoue et al. | 708/277 |

OTHER PUBLICATIONS

"Introduction to DSP Processors: Review of DSP Processors." Retrieved from www.bores.com, Nov. 9, 2002.

* cited by examiner

*Primary Examiner*—Chat C. Do
(74) *Attorney, Agent, or Firm*—Burns & Levinson LLP; Jacob N. Erlich; Orlando Lopez

(57) ABSTRACT

A method for approximating a base 2 logarithm of a binary input and the circuit to implement the method are disclosed. The circuit comprises means for determining the integer portion of the logarithm, a lookup table module, a residual function module, an adder module and a register. This circuit performs the approximation in one system clock cycle time.

13 Claims, 5 Drawing Sheets

CIRCUITS AND METHODS FOR IMPLEMENTING APPROXIMATIONS TO LOGARITHMS

STATEMENT OF GOVERNMENT INTEREST

This invention was made partially with U.S. Government support from the Defense Advanced Research Administration (DARPA) and the United States Air Force (USAF) under contract No. F33615-98-C-1372. The U.S. Government has certain rights in the invention.

BACKGROUND OF THE INVENTION

This invention relates generally to circuits and computational methods for obtaining an approximation to a base 2 logarithm of a binary number and, more particularly, to a circuits and methods for a fast approximation implemented with few components or embedded gate resources.

Logarithms appear in calculations in diverse fields ranging from audio to radar and also are used to facilitate computation. Due to the widespread use of logarithms in a calculation and computation, several methods and circuits have been proposed for approximating a logarithm of a binary input. However, previously available methods and circuits either require multipliers, which would render the calculation slower, requiring more cycles of processing time, or require a large number of elements, which would render the implementation as a circuit or integrated circuit costly.

Since converting from a logarithm of one base to a logarithm of another base only requires multiplying by scaling factor, no generality is lost by developing an approximation only for the base 2 logarithm of a binary input. The logarithm of an input number consists of an integer part, sometimes called the characteristic, and a fractional part, sometimes called the mantissa. For a binary input number, the integer part of the base 2 logarithm is equal to the number of bits down from the most significant bit. For example, for a hexadecimal input of 8FF0, corresponding to a binary input of 1000111111110000, there are 15 bits after the most significant bit. Therefore, the integer part of the base 2 logarithm is 15 or binary 1111 or hexadecimal F. Since the integer part of the base 2 logarithm of a binary input is so easily defined, a barrel shifter implementation has been used. Approximating the mantissa requires more effort.

In U.S. Pat. No. 5,801,974 (Park, Sep. 1, 1998), Park utilizes a multiplier, two adders and a shifter to obtain an approximation to the mantissa. In U.S. Pat. Nos. 5,629,884, 5,642,305 and 5,703,801 (Pan et al., May 13, 1997, Jun. 24, 1997, and Dec. 20, 1997, respectively), designs for an approximating circuit are disclosed comprising a memory, a multiplier unit and other components. In U.S. Pat. No. 5,365,465 (Larson, Nov. 15, 1994), U.S. Pat. No. 5,600,581 (Dworkin et al., Feb. 4, 1997), U.S. Pat. No. 5,831,878 (Ichida, Nov. 3, 1998) designs for an approximating circuit are disclosed comprising at least one multiplier unit.

For many applications, such as those performing real time calculations and/or implementing the approximation for use with a digital signal processor (DSP), the use of multipliers can result in additional required cycles of processing time to complete the calculation.

A design for a logarithm approximating circuit not utilizing multipliers is disclosed by Windsor et al. in U.S. Pat. No. 4,078,250 (Mar. 7. 1978). However, that design requires two lookup tables with 1024 entries each for 16 bit input, an adder and a subtractor as well as other components.

There is a need for a logarithm approximating circuit that occupies a small footprint (has fewer elements requiring fewer gates) and takes minimal hardware computation cycles.

SUMMARY OF THE INVENTION

The present invention discloses a method for approximating a base 2 logarithm of a binary input and the circuit for implementing such a method. The approximation includes an integer part and a mantissa. The binary input is composed of a given binary number of bits. More specifically, the method consists of the steps described below.

The binary input is partitioned into at least two partitions, where each one of the at least two partitions is composed of a second binary number of bits. That second binary number of bits is smaller than the first binary number of bits; and, each of the partitions has an indicator of placement in the binary input, that indicator being zero for the least significant position. The most significant one of the partitions is identified by locating the leftmost non-zero bit. The integer part of the approximation is determined from a binary representation of the indicator of placement of the most significant one of the partitions and from the binary bits corresponding to that most significant one of the partitions. The binary representation of the bits corresponding to the most significant one of the partitions is provided, as input, to a lookup table. The output of the lookup table is a binary representation of a mantissa for the logarithm of base 2 of the input to the lookup table. The second most significant one of the partitions is identified as the partition adjacent and to the right of the most significant partition. A third binary number is formed by appending to the binary bits in the second most significant one of the partitions a portion of the binary bits in the partition to the right of the second most significant one of the partitions. A residual binary output is obtained by introducing a shift in the third binary number where the shift determined by the integer portion of the base 2 logarithm of the binary input. The residual binary output is summed with the output from the lookup table to obtain the mantissa of the approximation to the base 2 logarithm of the binary input. The calculations of the residual and the lookup table output occur concurrently.

For an embodiment in which the input is a 16 bit binary number, the partitions are nibbles (4 bit partitions). The most significant nibble determines the integer part and is the input to the lookup table.

The method is implemented in a circuit including a scalar priority encoder, a lookup table module, a residual function module, an adder and a clocked register. The scalar priority encoder receives the binary input and provides as output of the encoder the integer part of the base 2 logarithm of the binary input. The lookup table module receives the binary input and a most significant part of the integer portion of the base 2 logarithm of the binary input. The residual function module receives the binary input and the integer portion of the base 2 logarithm of the binary input. The lookup table module and the residual function module operate concurrently; that is, there are no dependencies between the two modules. The adder receives the output of the lookup table module and the output of the residual function module and provides as output of the adder the mantissa of the approximation to the base 2 logarithm of the binary input. The clocked register receives the integer portion of the base 2 logarithm of the binary input and the mantissa of the approximation to the base 2 logarithm of the binary input. This circuit performs the approximation in one system clock cycle time.

Any means for obtaining, from the binary input, the integer part of the base 2 logarithm of the binary input can be used to replace the priority encoder. Those means could be a barrel shifter as in U.S. Pat. No. 5,831,878 or the circuit of U.S. Pat. No. 4,078,250. Since an algorithm exists for the integer part (as detailed in the preceding section), it is apparent that other means could be envisioned to implement the algorithm. However, in the embodiment of this invention in which means, other than the priority encoder, are used, it is not possible to ascertain that the circuit performs the approximation in one system clock time. Still, those embodiments comprise a fast and simple mantissa calculation.

For a better understanding of the present invention, together with other and further objects thereof, reference is made to the accompanying drawings and detailed description and its scope will be pointed out in the appended claims.

DETAILED DESCRIPTION OF THE PREFERRED EMBODIMENTS

The present invention is directed to a method for approximating a base 2 logarithm of a binary input and a circuit to implement the method, both of which are disclosed below. In one embodiment of the circuit of this invention, the circuit performs the approximation in one system clock cycle time. The approximation comprises an integer part and a mantissa. The binary input is comprised of a given binary number of bits.

Figure 1:
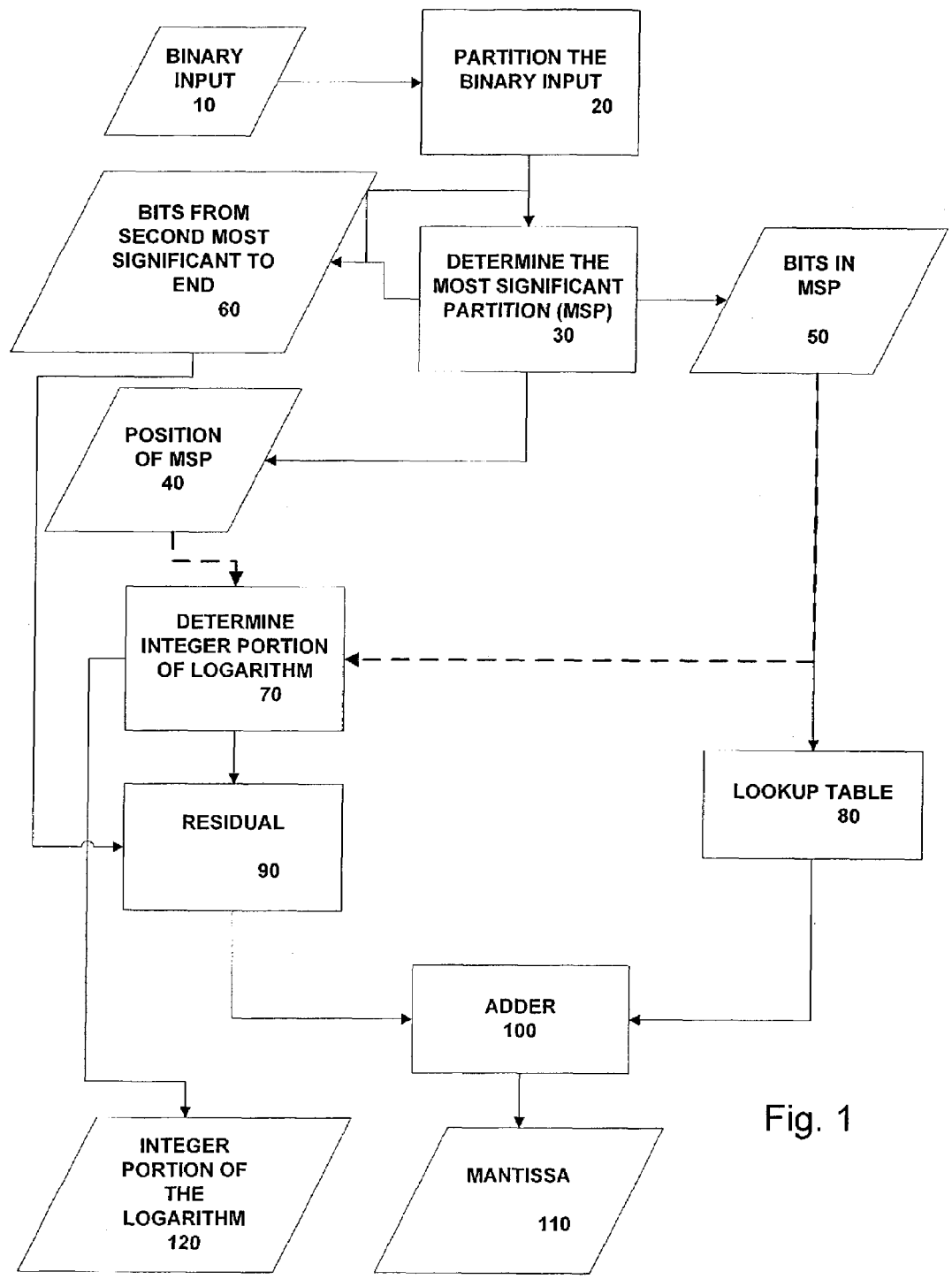
FIG. 1 is a flowchart of an embodiment of the method of this invention for approximating a base 2 logarithm of a binary input.

A flowchart of an embodiment of the method of this invention for approximating a base 2 logarithm of a binary input is shown in FIG. 1. Referring to FIG. 1, binary input 10 is composed of a given binary number of bits. The binary input 10 is partitioned into at least two partitions (step 20, FIG. 1), where each one of the partitions is comprised of a second binary number of bits, the second binary number being smaller than (or equal to in the trivial case) the first binary number of bits. Each of the partitions has an indicator of placement in the binary input, that indicator being zero for the least significant position. Then, the most significant one of the partitions is identified (step 30, FIG. 1). The most significant one is the partition that contains the leftmost 1 in the binary number 10. After determining the most significant one of the partitions, a binary representation of the indicator of placement of the most significant one of the partitions 40 and the binary bits corresponding to the most significant one of the partitions 50 are obtained. The integer part of the approximation (Lint) is determined from the binary representation of the indicator of placement of the most significant one of the partitions 40 and the binary bits corresponding to the most significant one of the partitions 50 (step 70, FIG. 1). The binary bits corresponding to the most significant one of the partitions 50 provide the input to the lookup table (step 80, FIG. 1). The output from the lookup table (hereinafter referred to as K) is a binary representation of a mantissa for the logarithm of base 2 of the input to the lookup table. A third binary number comprised of bits of the binary input 10 up to a second most significant one of the partitions 60 can be obtained from the partitioned binary input 20 and the most significant one of the partitions 50. That binary number is obtained by appending, to the second most significant one of the partitions 60, a portion of the partition to the right of the second most significant one of the partitions 60. When the most significant one of the partitions 60 has an indicator of placement equal to zero (which occurs when the most significant one of the partitions is the rightmost partition), the binary bits in the second most significant one of the partitions 60 are, by definition, all zeros. Similarly, if the second most significant one of the partitions has an indicator of placement equal to zero, or if he most significant one of the partitions 60 has an indicator of placement equal to zero, the binary bits in the portion appended to the second most significant one of the partitions are, by definition, all zeros. The third binary number, hereinafter referred as $\Gamma$, is the input to the determination of the residual (step 90, FIG. 1). The residual is obtained by shifting the third binary number, $\Gamma$, by a shift determined by the integer portion of the base 2 logarithm of the binary input. (The shift can be represented as $\Gamma/2^n$) Only a number of bits equal to the number of bits in the third binary number, $\Gamma$, are retained after the shift. As the third binary number, $\Gamma$, is subjected to the shift zeroes are placed in the bit locations on the left which have been vacated by the shift. The two preceding statements are included in the definition of the shift. The residual and the output from the lookup table are added (step 100, FIG. 1) to obtain approximation to the mantissa 110 of the base 2 logarithm of the binary input.

Based on the above nomenclature defined above, the approximation of this invention to a base 2 logarithm of a binary input can be expressed as $$\text{Log}_2(x) = L_{int} + [K + (\Gamma/2^n)]$$

And, the approximation to the mantissa of a base 2 logarithm of a binary input ($L_{frac}$) is given by $$L_{frac} = K + (\Gamma/2^n).$$

It is clear that, since the integer portion of the base 2 logarithm of the binary input can be obtained by other means (as previously described), such other means can be combined with the method described for approximating the mantissa 110 of the base 2 logarithm of the binary input. For an embodiment of the method of this invention for approximating the mantissa of a base 2 logarithm of a binary input when the integer portion of the base 2 logarithm of the binary input is obtained by other means than those of this invention, the dotted lines in the flowchart of FIG. 1 are ignored.

Figure 2:
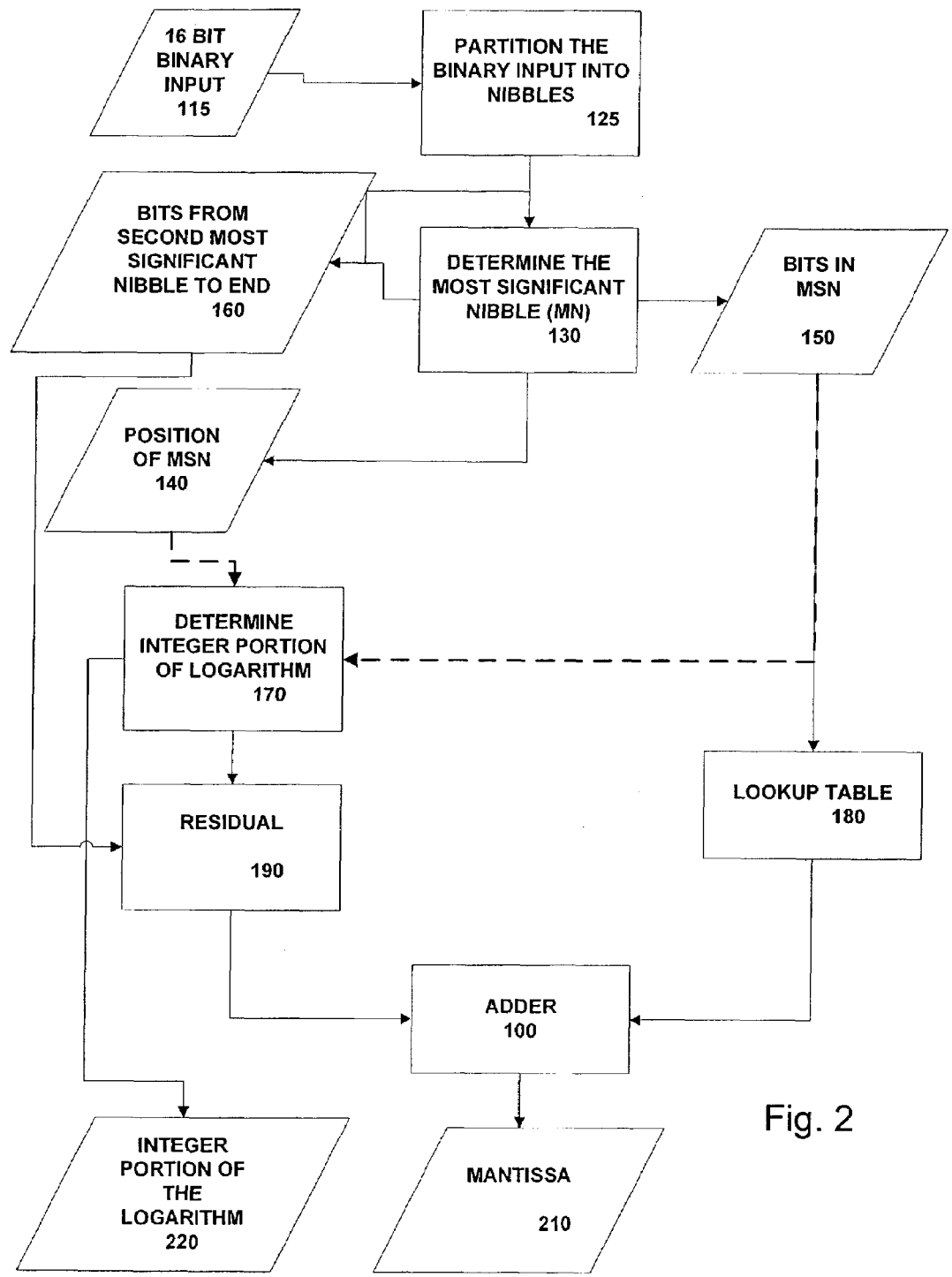
FIG. 2 is a flowchart of an embodiment of the method of this invention for approximating a base 2 logarithm of a 16 bit binary input.

A flowchart of an embodiment of the method of this invention for approximating a base 2 logarithm of a 16 bit binary input is shown in FIG. 2. When the binary input is a 16 bit binary number, the partitions are nibbles (4 bit partitions). The most significant nibble determines the integer part and is the input to the lookup table. Referring to FIG. 2, 16 bit binary input 115 is partitioned into four nibbles (step 125, FIG. 2). Then, the most significant nibble is identified (step 130, FIG. 2). The most significant nibble is the nibble that contains the leftmost 1 in the binary number 115. After determining the most significant one of the partitions, a binary representation of the indicator of placement of the most significant nibble 140 and the binary bits corresponding to the most significant nibble 150 are obtained.

The integer part of the approximation is determined from the binary representation of the indicator of placement of the most significant nibble 140 and the binary bits corresponding to the most significant nibble 150 (step 170, FIG. 2). If the integer part of the approximation is represented by $$i_3 i_2 i_1 i_0,$$

$i_3 i_2$ correspond to the binary representation of the indicator of placement of the most significant nibble 140. If the binary bits corresponding to the most significant nibble 150 are represented by $$n_3 n_2 n_1 n_0,$$

$i_1$ is given by $$i_1 = n_3 \text{ OR } n_2,$$

where OR is the binary (logical) OR operation. Similarly, $i_0$ is given by $$i_0 = n_3 \text{ OR } (\text{NOT } (n_2) \text{ AND } n_1),$$

where NOT and AND are the binary (logical) OR operations.

The binary bits corresponding to the most significant nibble 150 provide the input to the lookup table (step 180, FIG. 2). The lookup table, for one implementation, is given below.

integer portion of the base 2 logarithm of the binary input, the 7 bits used to determine Γ can be defined by Table 2 below.

TABLE 2

| Log$_{int}$ | | | Residual Range Bit No's |
|---|---|---|---|
| Bit 3 | Bit 2 | Linear Range | Converted to 7 Bit |
| 0 | 0 | 0000-000F | VALUE=0 |
| 0 | 1 | 0010-00FF | 3 2 1 0 +$_{concatenate}$ 0 0 0 |
| 1 | 0 | 0100-0FFF | 7 4 5 4 3 2 1 |
| 1 | 1 | 1000-FFFF | 11 10 9 8 7 6 5 |

Table 2 succinctly summarizes the procedure for obtaining the third binary number, Γ. When the most significant nibble is the rightmost nibble (a binary number between 0000 and 000F in hexadecimal), the binary bits in the second most significant nibble are, by definition, all zeros and the binary bits in the portion appended to the second most significant nibble are, by definition, all zeros. When the most significant nibble is a binary number between 0010 and 00FF in hexadecimal, the second most significant nibble is the rightmost nibble (including binary bits in locations 3,2,1,0) and the binary bits in the portion appended to the second most significant nibble are, by definition, all zeros. When the most significant nibble is a binary number between 0100 and 00FF or a binary number between 1000 and FFFF in hexadecimal, the second most significant nibble is the nibble to the right of the most significant nibble and the three bits to the right of the second most significant nibble are appended to the second most significant nibble to form the third binary number, Γ.

The residual is obtained by shifting the 7 bits after the most significant nibble 160 (third binary number, Γ) by a

TABLE 1

| HEX CHARACTER (X) | Bit 6.5000 | Bit 5.2500 | Bit 4.1250 | Bit 3.0625 | Bit 2.0312 | Bit 1.0156 | Bit 0.0078 |
|---|---|---|---|---|---|---|---|
| 3, 6, C | 1 | 0 | 0 | 1 | 0 | 1 | 1 |
| 5, A | 0 | 1 | 0 | 1 | 0 | 1 | 0 |
| 0, 1, 2, 4, 8, 16 | 0 | 0 | 0 | 0 | 0* | 1* | 1* |
| 7, E | 1 | 1 | 0 | 0 | 1 | 1 | 1 |
| 9 | 0 | 0 | 1 | 0 | 1 | 1 | 0 |
| B | 0 | 1 | 1 | 1 | 0 | 1 | 1 |
| D | 1 | 0 | 1 | 1 | 0 | 1 | 0 |
| F | 1 | 1 | 1 | 0 | 1 | 0 | 0 |

*Denotes the value for an implementation in which a Carry-in function is used.

In this implementation of the invention, the lookup table provides 7 bits as output. The number of bits is determined by the accuracy desired.

A third binary number, Γ, comprised of bits of the binary input up to a second most significant nibble 160 can be obtained from the partitioned binary input 125 and the most significant nibble 150. That binary number is obtained by appending, to the second most significant nibble 160, a portion of the nibble to the right of the second most significant nibble 160. The third binary number, Γ, is the input to the determination of the residual (step 190, FIG. 12). In one implementation, only the 7 bits after the most significant nibble are used. Again, the number of bits is determined by the accuracy desired. Since the most significant nibble is indicated by the bits 3 and 2 ($i_3 i_2$) of the shift determined by the integer portion of the base 2 logarithm of the binary input and keeping only the seven most significant bits after the shift. Table 3 defines the divisor, based on Bit 1 and Bit 0 ($i_1$ and $i_0$) of the integer portion of the base 2 logarithm of the binary input, that will be used to determine the shift of the 7 bits after the most significant nibble.

TABLE 3

| L$_{int}$ | | | Range |
|---|---|---|---|
| Bit 1 | Bit 0 | Divisor | of L$_{int}$ |
| 0 | 0 | 0 | 0-3 |
| 0 | 1 | 2 | 4-7 |

TABLE 3-continued

| $L_{int}$ | | | Range |
|---|---|---|---|
| Bit 1 | Bit 0 | Divisor | of $L_{int}$ |
| 1 | 0 | 4 | 8-11 |
| 1 | 1 | 8 | 12-15 |

The residual (190, FIG. 2) and the output from the lookup table (180, FIG. 2) are added (step 200, FIG. 2) to obtain approximation to the mantissa 210 of the base 2 logarithm of the binary input. The addition operation is defined so as to account for overflow conditions.

Since the integer portion of the base 2 logarithm of the binary input can be obtained by other means (as previously described), those other means can be combined with the method described for approximating the mantissa 210 of the base 2 logarithm of the binary input. For an embodiment of the method of this invention for approximating the mantissa of a base 2 logarithm of a binary input when the integer portion of the base 2 logarithm of the binary input is obtained by other means than those of this invention, the dotted lines in the flowchart of FIG. 2 are ignored.

EXAMPLES

In order to even more clearly understand the present invention, reference is now made to the following illustrative examples.

Example 1

Binary Input is Hexadecimal 6700, which is binary 0110 0111 0000 0000.

In writing the binary number, it has already been partitioned into "nibbles". The most significant nibble is nibble 3, thus, the first two bits in the integer portion, $i_3 i_2$, are given by 11.

The most significant nibble is 0110. Then, bit 3 of the integer portion, $i_1$ is given by $i_1$=0 OR 1=1.

Bit 4 of the integer portion $i_0$, is given by $i_0 n_3$ OR (NOT ($n_2$) AND $n_1$)=0 OR (NOT (1) and 1)=0.

The integer portion of the logarithm 220 of 6700 (Hex) is given by 1110.

The input to the lookup table is 6. This input yields 1 0 0 1 0 1 1 as output of the lookup table.

The portion of the binary number comprised of bits of the binary input up to a second most significant nibble 160 (Γ) is, from Table 2, given by 0 1 1 1 0 0 0.

Since the bit 1 and bit 0 of the integer portion are 1 0 respectively, according to Table 3, the divisor is 4 which results in a shift of 2 positions. The residual is then

| given by | 0 | 0 | 0 | 1 | 1 | 1 | 0 | . | |
|---|---|---|---|---|---|---|---|---|---|
| This added to | | 1 | 0 | 0 | 1 | 0 | 1 | 1 | |
| To obtain | | 1 | 0 | 1 | 1 | 0 | 0 | 1 | . |

The four most significant bits yield 1 0 1 1 as the approximation to the mantissa 210. Expressed in hexadecimal, the integer portion is E and the mantissa is B.

Example 2

(Illustrative of the Overflow)

Binary Input is Hexadecimal 03F0, which is binary 0000 0011 1111 0000.

The most significant nibble is nibble 2, thus, the first two bits in the integer portion, $i_3 i_2$, are given by 10.

The most significant nibble is 0011. Then, bit 3 of the integer portion, $i_1$ is given by $i_1$=0 OR 0=0.

Bit 4 of the integer portion $i_0$, is given by $i_0$=$n_3$ OR (NOT ($n_2$) AND $n_1$)=0 OR (NOT (0) and 1)=1.

The integer portion of the logarithm 220 of 03F0 (Hex) is given by 1001.

The input to the lookup table is 3. This input yields 1 0 0 1 0 1 1 as output of the lookup table.

The portion of the binary number comprised of bits of the binary input up to a second most significant nibble 160 (Γ) is obtained by appending, to the second most significant nibble (1111), three bits from the nibble to the right of the second most significant nibble (as can be seen from Table 2), and is given by 1111000.

Since the bit 1 and bit 0 of the integer portion are 0 1 respectively, according to Table 3, the divisor is 2 which results in a shift of 1 positions. The residual is then

| given by | 0 | 1 | 1 | 1 | 1 | 0 | 0 | . | |
|---|---|---|---|---|---|---|---|---|---|
| This added to | | 1 | 0 | 0 | 1 | 0 | 1 | 1 | |
| To obtain | | 1 | 0 | 0 | 0 | 0 | 1 | 1 | 1 | . |

The above is an example of an overflow or carry-over condition.

To the accuracy available 1 0 0 0 0 is represented by 1 1 1 1 which is the closest digit. Thus, the approximation to the mantissa 210 is given by 1111. Expressed in hexadecimal, the integer portion is 9 and the mantissa is F.

Figure 3:
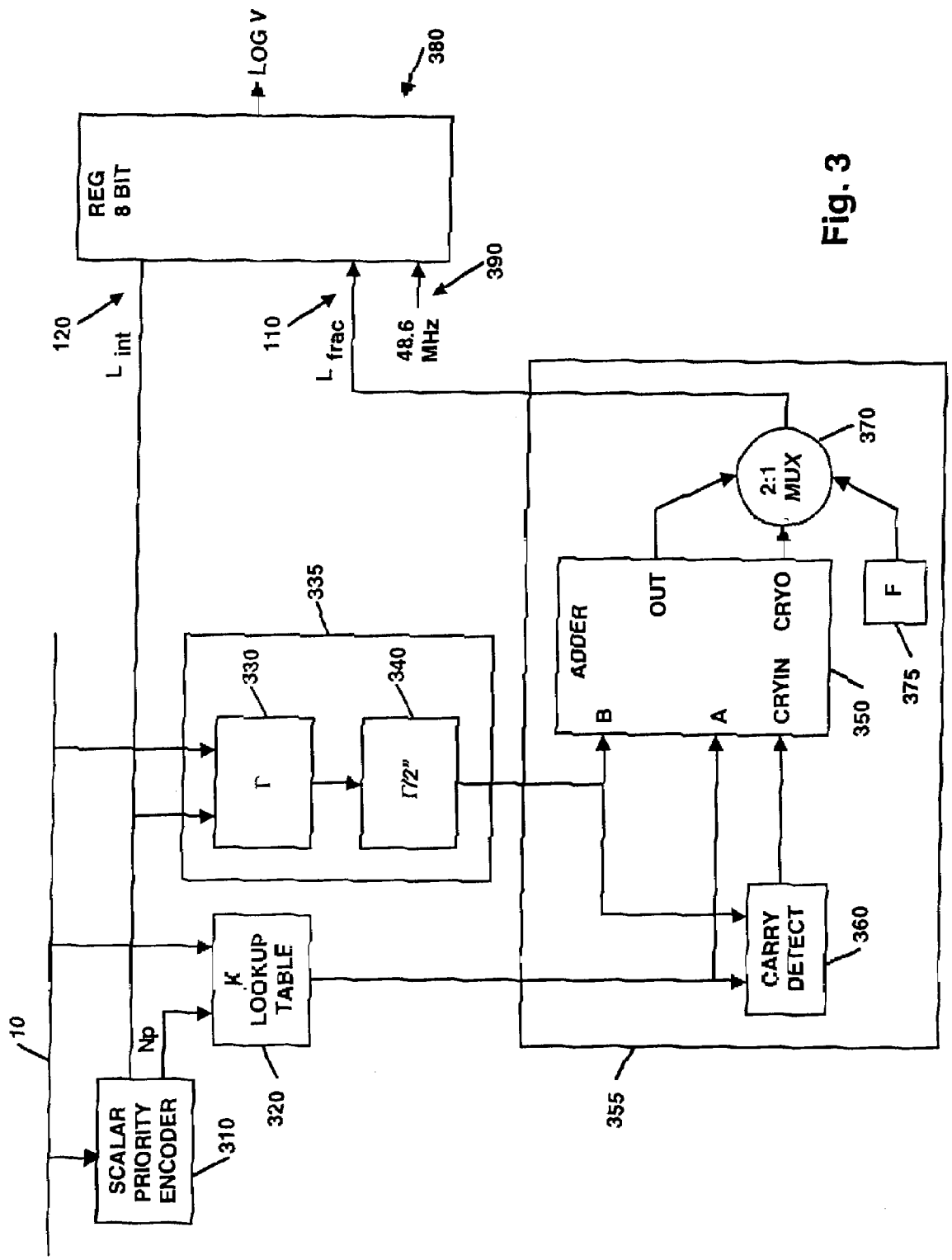
FIG. 3 is a block diagram of an embodiment of the circuit for implementing the method of this invention.

FIG. 3 is a block diagram of an embodiment of a circuit (also referred to as a system) of this invention for implementing the method of FIG. 1. Referring to FIG. 3, Scalar Priority Encoder 310 provides means for determining the integer part of the logarithm 120. A pointer, given by a portion (the two most significant bits, in the embodiment in which the input is a 16 bit number) of the integer part, to the most significant one of the partitions and the digital input 10 serve as input to a lookup table 320. The integer part of the logarithm 120 and the digital input 10 serve as inputs to a residual function module, which is comprised of two sub-modules 330 and 340. Sub-module 330 provides the portion of the binary number comprised of bits of the binary input 115 starting at the second most significant one of the transitions 160 (Γ). In the embodiment in which the input is a 16 bit binary number, the portion (Γ) comprises 7 bits. The portion Γ is shifted by the module 340 to produce the residual 190. The residual 190 and the output of the lookup table 320 are inputs to the adder 350, which produces the approximation to the mantissa 110. The carry detect 360 and the 2:1 MUX 370 are implementation dependent corrections to the adder to ensure accuracy.

The components of the circuit of FIG. 3, scalar priority encoder 310, lookup table 320, residual function module 335, and adder module 350, for one embodiment, for a 16 bit binary input, are described in more detail below.

Scalar Priority Encoder 310

An embodiment of the Scalar Priority Encoder 310 is described by the reference to the tables below. (Recall that a priority encoder gives an output corresponding to the highest number input that is asserted.)

Since the 16 bit digital input 115 has four (4) nibbles, each of the nibbles is labeled by its indicator of placement. That is, N3 is the leftmost nibble and N0 is the rightmost nibble. The output of the priority encoder 320 is given below for each of the four input conditions: N3 nibble contains the highest (leftmost) bit asserted in the input, N2 nibble contains the highest (leftmost) bit asserted in the input, N1 nibble contains the highest (leftmost) bit asserted in the input, and, N0 nibble contains the highest (leftmost) bit asserted in the input. Foe each of these four input conditions, a table is given below describing the scalar priority encoder 320 output corresponding to the highest (leftmost) bit asserted in the input nibble.

When the N3 nibble contains the highest (leftmost) bit asserted in the input, the scalar encoder 320 will take the most significant nibble of the binary input 115 and convert the priority level of the single bit to the range C-F as shown in Table 4 below:

TABLE 4

| Input | | | | | |
|---|---|---|---|---|---|
| Nibble | Bit | Out 3 | Out 2 | Out 1 | Out 0 |
| 15 | (Nb3) | 1 | 1 | 1 | 1 |
| 14 | (Nb2) | 1 | 1 | 1 | 0 |
| 13 | (Nb1) | 1 | 1 | 0 | 1 |
| 12 | (Nb0) | 1 | 1 | 0 | 0 |

Based on this table N3 equation is:
Out 3 = 1
Out 2 = 1
Out 1 = Nb3 OR Nb2
Out 0 = Nb3 OR (NOT(Nb2) AND Nb1)

N2 Scalar Encoder

When the N2 nibble contains the highest (leftmost) bit asserted in the input, the scalar encoder 320 will take the second most significant nibble of the binary input 115 and convert the priority level of the single bit to the range 8-B as shown in Table 5 below:

TABLE 5

| Input | | | | | |
|---|---|---|---|---|---|
| Nibble | Bit | Out 3 | Out 2 | Out 1 | Out 0 |
| 11 | (Nb3) | 1 | 0 | 1 | 1 |
| 10 | (Nb2) | 1 | 0 | 1 | 0 |
| 9 | (Nb1) | 1 | 0 | 0 | 1 |
| 8 | (Nb0) | 1 | 0 | 0 | 0 |

Based on this table N2 equation is:
Out 3 = 1
Out 2 = 0
Out 1 = Nb3 OR Nb2
Out 0 = Nb3 OR (NOT(Nb2) AND Nb1)

When the N1 nibble contains the highest (leftmost) bit asserted in the input, the scalar encoder will take the third most significant nibble of the binary input 115 and convert the priority level of the single bit to the range 4-7 as shown in Table 6 below:

| Input | | | | | |
|---|---|---|---|---|---|
| Nibble | Bit | Out 3 | Out 2 | Out 1 | Out 0 |
| 7 | (Nb3) | 0 | 1 | 1 | 1 |
| 6 | (Nb2) | 0 | 1 | 1 | 0 |
| 5 | (Nb1) | 0 | 1 | 0 | 1 |
| 4 | (Nb0) | 0 | 1 | 0 | 0 |

Based on this table N1 equation is:
Out 3 = 0
Out 2 = 1
Out 1 = Nb3 OR Nb2
Out 0 = Nb3 OR (NOT(Nb2) AND Nb1)

When the N0 nibble contains the highest (leftmost) bit asserted in the input, the scalar encoder will take the least significant nibble of the binary input 115 and convert the priority level of the single bit to the range 0-3 as shown in Table 7 below:

TABLE 7

| Input | | | | | |
|---|---|---|---|---|---|
| Nibble | Bit | Out 3 | Out 2 | Out 1 | Out 0 |
| 3 | (Nb3) | 0 | 0 | 1 | 1 |
| 2 | (Nb2) | 0 | 0 | 1 | 0 |
| 1 | (Nb1) | 0 | 0 | 0 | 1 |
| 0 | (Nb0) | 0 | 0 | 0 | 0 |

Based on this table N0 equation is:
Out 3 = 0
Out 2 = 0
Out 1 = Nb3 OR Nb2
Out 0 = Nb3 OR (NOT(Nb2) AND Nb1)

The scalar priority encoder output provides the integer portion of the logarithm ($L_{int}$) 220.

Lookup Table Function (K) 320

The binary bits corresponding to the most significant nibble 150 provide the input to the lookup table 320. The binary bits corresponding to the most significant nibble 150 are obtained from the binary input 115 and the two most significant bits of the integer portion of the logarithm ($L_{int}$) 220 (the pointer to the most significant nibble). The output from the lookup table (K) 320 is a binary representation of the mantissa for the logarithm of base 2 of the input to the lookup table, as given in Table 1. The constants are carried to 7 places in order to accurately derive the 8 bit (4-integer; 4-fractional) calculation of the approximation of the base 2 logarithm of a binary input.

The constant corresponding to an input of 0, 2, . . . 8, is extended to 0000011 when the carry in adjustment method is used.

This function can be implemented as a multi-processing function by taking its input from the linear amplitude data, or, it can be made simpler by taking its input from the output of the Scalar Priority Encoder. In this embodiment, the function is implemented using the Scalar Priority Encoder since the Scalar Priority Encoder has an extremely small processing delay.

The lookup table function 320 can be implemented by means of a ROM or a virtual ROM (a transparent RAM).

Residual Function Module 335

The residual function module 335 includes sub-module 330 and sub-module 340, and has as output the residual 190 (see FIG. 2). Sub-module 330 provides the portion of the binary number comprised of bits of the binary input 115 starting at the second most significant nibble 160 (Γ). Sub-module 330 uses bit 3 and bit 2 of the integer portion of the logarithm ($L_{int}$) 220 to determine what part of the sixteen (16) bits of linear data is residual data according to Table 2. The most significant seven- (7) bits of derived residual data is taken and passed to the second sub-module 340.

Sub-module 340 uses Bit 1 and Bit 0 of the integer portion of the logarithm ($L_{int}$) 220, according to Table 3 above, to determine what divisor will be acting on the seven (7) bits of output from Sub-module 330. The divisor will indicate a shift that will enter zeros into the most significant bits of the residual 190.

Sub-modules 330 and 340 have no dependency on the other for setup and control. Therefore, the data has minimal processing delay.

Adder Function 355

Included in the adder function 355 are the adder 350, the carry detect module 360 and the 2:1 MUX 370. If the output of the lookup table 320 has zeros in the four most significant bits and the weight of the residual is greater than 4 bits, the carry detect module 360 carries in a one (1) in the least significant bit of the addition. This module would not be needed in a higher precision implementation.

The 2:1 MUX 370 selects the four most significant bits of the adder 350 output for the approximation to the mantissa ($L_{frac}$) 210. If an overflow occurs in the addition, it will be indicated in the carry out (CRYO). If the carry out is asserted, all four bits of the approximation to the mantissa 210 are set to one (1). (In hexadecimal notation, the approximation to the mantissa ($L_{frac}$) 210 is then set to hexadecimal F 375 as indicated by the block in FIG. 3.)

The approximation to the mantissa ($L_{frac}$) 210 and the integer portion of the logarithm ($L_{int}$) 220 are provided to a register 380. Another input to the register 380 is a clock signal 390. The output of register 380 (Log V) is an 8 bit output having the integer portion of the logarithm ($L_{int}$) 220 in bits 7 through 4 and the approximation to the mantissa ($L_{frac}$) 210 in bits 3 through 0.

Figure 4:
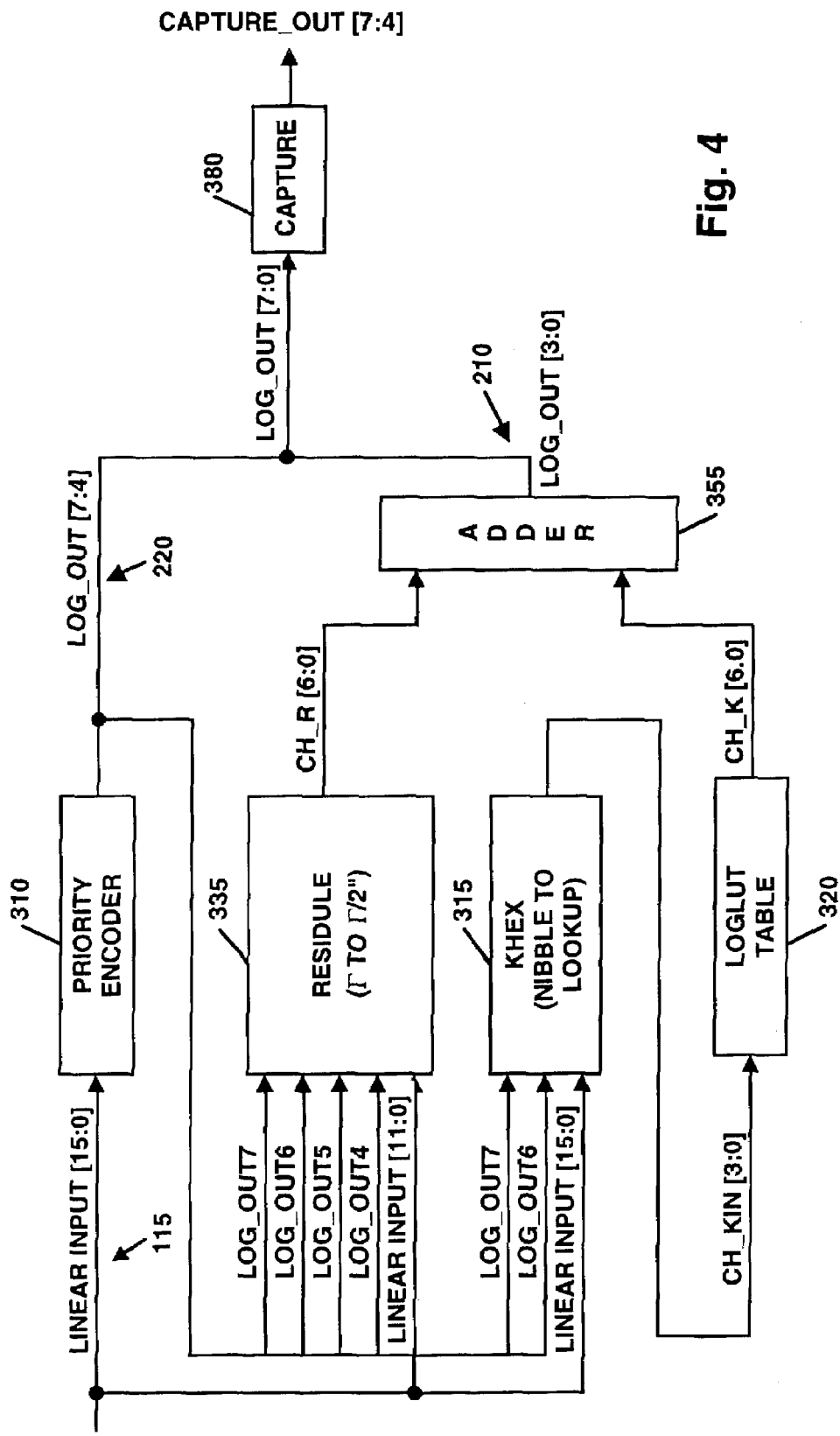
FIG. 4 is a schematic block diagram of an embodiment of the circuit for implementing the method of this invention for a 16 bit binary input, depicting the input lines into each block.

A schematic block diagram of an embodiment of the circuit for implementing the method of this invention for a 16 bit binary input, depicting the input lines into each block, is shown in FIG. 4. KHEX Block 315 selects the actual binary representation of the most significant "nibble" and provides it as input to the lookup table 320. The KHEX Block 315 and the lookup table 320 comprise a lookup table function module receiving as the binary input 115 and the most significant part of the integer portion of the base 2 logarithm of the binary input ($L_{int}$) 220. Residual Function Module 335 comprises Sub-modules 330 and 340. Adder module 355 comprises the adder 350, any carry in such as carry detect block 360, and the 2:1 MUX 370. Since the priority encoder is comprised of multiplexers, the lookup table is a transparent RAM, the approximation is performed in one system clock cycle time.

It should be noted that, for implementations of different precision, different implementations of the adder function will be used. These modifications should be apparent to one skilled in the art. It should also be noted that, for a given accuracy, various choices are possible for the adder function implementation. It should further be noted that the choice of method to account for accuracy concerns can impact some of the lookup table constants (namely those for a $2^n$ input).

Although the detailed embodiment was described for a 16 bit, it should be apparent that this invention is not limited to such an implementation, and can, for example, be used with a 32 bit input.

Other Implementations

Figure 5:
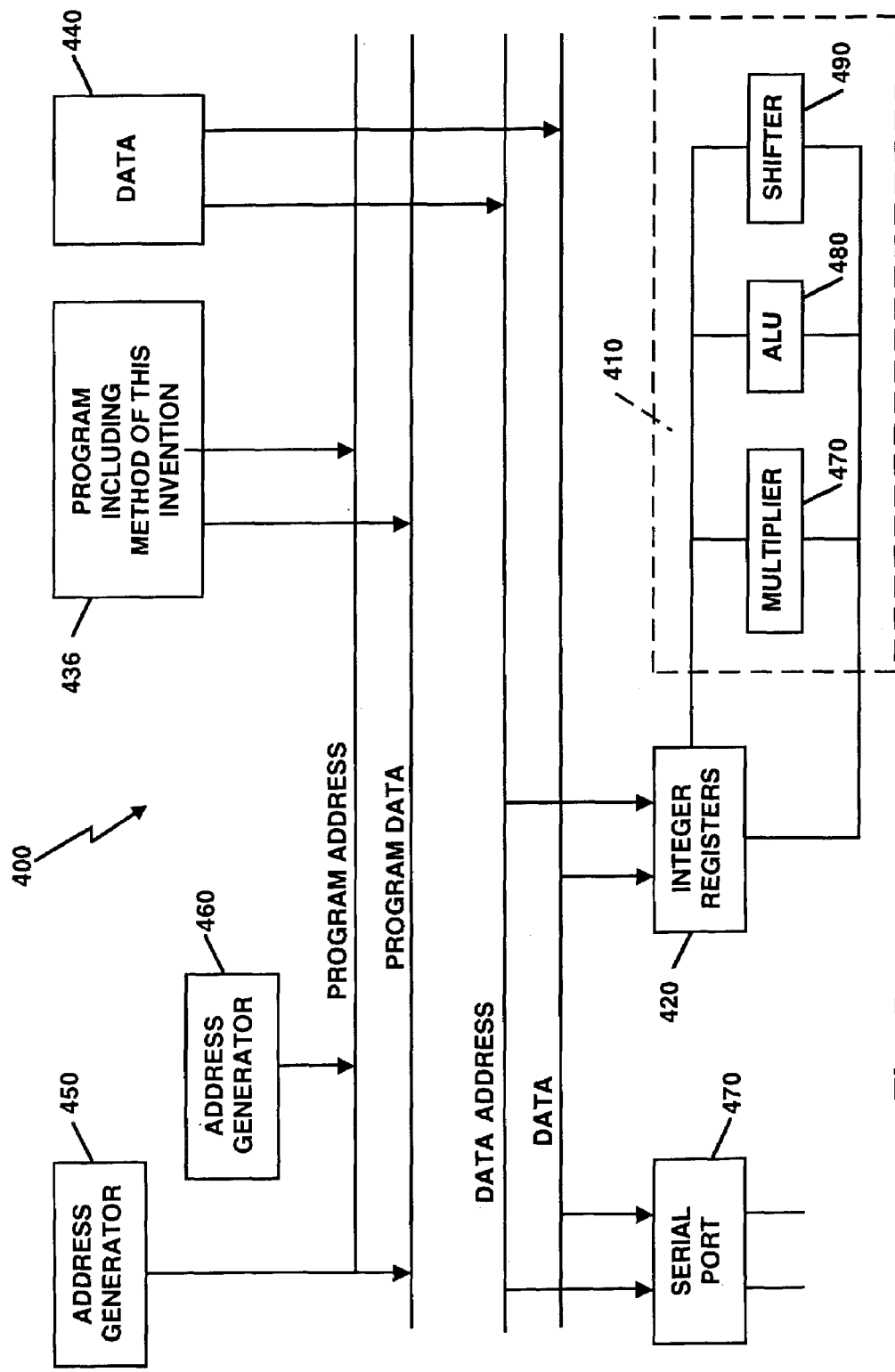
FIG. 5 depicts a block diagram of another embodiment of a system for implementing the method of this invention.

While the above presented embodiments utilize system of FIG. 3, other embodiments are possible utilizing one or more processor sub-systems and one or more computer readable memories having embodied therein capable of causing the at least one processing sub-system to execute the method of this invention. A typical embodiment of a digital signal processing system (DSP) 400 for implementing the method of this invention is shown in FIG. 5. It should be noted that other architectures different from that of the system 400 of FIG. 5 are possible. For example, architectures with a single memory bus rather two memory busses, as shown in FIG. 5, are also used. The program to execute the method of FIG. 1 or FIG. 2 resides in computer readable memory 436. (It should be noted that the program to execute the method of FIG. 1 or FIG. 2 can reside in more than one computer readable memory in order to achieve the most efficient implementation.) Since the method of this invention requires only a minimal data constant array, the data constant array can be retrieved from a small region of non-volatile memory (i.e. Flash) or read into a small working register array on board the DSP. The system 400 of FIG. 5 allows for both possibilities with input port 470 and register 420. While the system 400 shows one shifter 490 on the right of ALU 480 in the processing sub-system 410, other architectures are possible. Many DSP architectures exhibit a substantially symmetrical architecture including input data manipulation function (e-g- shifters, converters, etc) on both sides of the ALU, ALU right and ALU left. The method of this invention does not require inter process dependency (does not use step results) to gain the "one cycle" conversion. For a substantially symmetrical DSP architecture, computer readable code can be provided that advantageously utilizes the ALU right input and ALU left input data manipulation functions, as well as the typical ALU output resources, to closely emulate the key functions of the hardware system of FIG. 4. Such an implementation of the method of FIG. 1 would have a performance approaching the "one cycle" performance achievable with the system of FIG. 4, achieving an execution time of a minimal number of system clock cycle times.

Although the invention has been described with respect to various embodiments, it should be realized this invention is also capable of a wide variety of further and other embodiments within the spirit and scope of the appended claims.

What is claimed is:

1. A method of approximating a base 2 logarithm of a binary input utilizing a digital circuit, the binary input comprised of a first binary number of bits, the method comprising the steps of:

partitioning the binary input into at least two partitions, each one of said at least two partitions comprised of a second binary number of bits, said second binary number being smaller than said first binary number of bits;

determining a most significant one of said at least two partitions;

determining an integer part of the approximation;

providing as input to a lookup table a binary representation of the bits in said second binary number of bits corresponding to said most significant one of said partitions;

obtaining an output from the lookup table, said output being a binary representation of a mantissa for the logarithm of base 2 of the input to the lookup table;

determining a second most significant one of said at least two partitions;

obtaining a third binary number by appending of portion of a binary representation of the bits in said second binary number of bits corresponding to the partition to the right of the second most significant one of said at least two partitions;

obtaining a residual binary output from shifting said third binary number by a shift determined by said integer portion of the base 2 logarithm of the binary input; and, adding the residual binary output to the output from the lookup table to obtain the mantissa of the approximation to the base 2 logarithm of the binary input;

the mantissa and the integer part providing an approximation to the base 2 logarithm of the binary input;

said method a group of steps producing the lookup table output and a group of steps resulting in said residual binary output operating concurrently; and there being no dependencies between the two groups of steps;

the approximation to the base 2 logarithm of the binary input being used in a system for an application;

whereby the application is radar, a calculator or audio;

the method being implementable in hardware and requiring substantially minimal hardware computation cycles.

2. The method of claim 1 wherein the step of determining the integer part of the approximation comprises the step of:

determining from a binary representation of an indicator of placement of the most significant one of said partitions and from a binary representation of the binary bits in said second binary number of bits corresponding to said most significant one of said partitions, the integer part of the approximation.

3. The method of claim 1 wherein the first binary number of bits is 16, the partitions are comprised of nibbles, and the shift utilized in obtaining the residual binary output comprises a shift determined by bit 1 and bit 0 of the integer portion of the base 2 logarithm of the binary input.

4. The method of claim 2 wherein the first binary number of bits is 16, the partitions are comprised of nibbles, and the shift utilized in obtaining the residual binary output comprises a shift determined by bit 1 and bit 0 of the integer portion of the base 2 logarithm of the binary input.

5. A system for approximating a base 2 logarithm of a binary input, the binary input comprised of a first binary number of bits, the binary input capable of being expressed in terms of at least two partitions, said system comprising:

means for providing, from the binary input, an integer portion of the base 2 logarithm of said binary input;

a lookup table module receiving the binary input and a most significant one of at least two partitions of the binary input; an output from said lookup table module being a binary representation of a mantissa for a logarithm of base 2 of said most significant one of said at least two partitions of the binary input;

a residual function module receiving the binary input and said integer portion of the base 2 logarithm of the binary input; an output of said residual function module being obtained by shift operations on a binary number obtained from a second most significant one of said at least two partitions of the binary input;

an adder function module receiving the output of the lookup table and the output of the residual function module and providing an output, said output of said adder function module comprising a mantissa of the approximation to the base 2 logarithm of the binary input; and, a clocked register receiving the integer portion of the base 2 logarithm of the binary input and the mantissa of the approximation to the base 2 logarithm of the binary input; the approximation to the base 2 logarithm of the binary input being used in a system for an application;

the first binary number of bits being a multiple of 4 bits, the partitions being comprised of nibbles, the residual function module comprising a shift and said shift being determined by initial bits of the integer portion of the base 2 logarithm of the binary input;

whereby the application is radar, a calculator or audio;

the approximation requiring substantially reduced hardware computation cycles.

6. The system of claim 5 wherein said lookup table receives said binary input and a pointer to a most significant one of said partitions of the binary input and wherein said pointer is obtained from the most significant part of said integer portion of the base 2 logarithm of the binary input.

7. A system for approximating a base 2 logarithm of a binary input, the binary input comprised of a first binary number of bits, the binary input capable of being expressed in terms of at least two partitions, said system comprising:

means for providing, from the binary input, an integer portion of the base 2 logarithm of said binary input;

a lookup table module receiving the binary input and a most significant one of at least two partitions of the binary input; an output from said lookup table module being a binary representation of a mantissa for a logarithm of base 2 of said most significant one of said at least two partitions of the binary input;

a residual function module receiving the binary input and said integer portion of the base 2 logarithm of the binary input; an output of said residual function module being obtained by shift operations on a binary number obtained from a second most significant one of said at least two partitions of the binary input;

an adder function module receiving the output of the lookup table and the output of the residual function module and providing an output, said output of said adder function module comprising a mantissa of the approximation to the base 2 logarithm of the binary input; and, a clocked register receiving the integer portion of the base 2 logarithm of the binary input and the mantissa of the approximation to the base 2 logarithm of the binary input;

wherein said means for providing the integer portion of the base 2 logarithm comprise a scalar priority encoder and wherein said approximation is performed in one system clock cycle time;

the approximation to the base 2 logarithm of the binary input being used in a system for an application;

the first binary number of bits being a multiple of 4 bits, the partitions being comprised of nibbles, the residual function module comprising a shift and said shift being determined by initial bits of the integer portion of the base 2 logarithm of the binary input;

whereby the application is radar, a calculator or audio;

the approximation requiring substantially reduced hardware computation cycles.

8. A digital system for approximating a base 2 logarithm of a binary input, the binary input comprised of a first binary number of bits, the system comprising:
  at least one processing sub-system;
  at least one computer usable memory for storing data for access by computer readable code being executed on said at least one processor, said computer usable medium comprising:
    a data structure stored in said computer readable medium, said data structure including a look-up table; and,
  at least one other computer usable memory having computer readable code embodied therein capable of causing the at least one processing sub-system to:
    partition the binary input into at least two partitions, each one of said at least two partitions comprised of a second binary number of bits, said second binary number being smaller than said first binary number of bits;
    determine a most significant one of said at least two partitions;
    determine an integer part of the approximation;
    provide as input to the lookup table a binary representation of the bits in said second binary number of bits corresponding to said most significant one of said partitions;
    obtain an output from the lookup table, said output being a binary representation of a mantissa for the logarithm of base 2 of the input to the lookup table;
    determine a second most significant one of said at least two partitions;
    obtain a third binary number by appending of portion of a binary representation of the bits in said second binary number of bits corresponding to the partition to the right of the second most significant one of said at least two partitions;
    obtain a residual binary output from shifting said third binary number by a shift determined by said integer portion of the base 2 logarithm of the binary input; and,
  add the residual binary output to the output from the lookup table to obtain the approximation to the mantissa of the base 2 logarithm of the binary input;
  wherein the approximation to the base 2 logarithm of the binary input comprises said integer portion and said approximation to the mantissa;
  the approximation to the base 2 logarithm of the binary input being used in a system for an application;
  whereby the application is radar, a calculator or audio;
  the approximation requiring substantially minimal hardware computation cycles.

9. The system of claim 8 where, in determining the integer part of the approximation, the computer readable code is capable of causing the at least one processing sub-system to:
  determine from a binary representation of an indicator of placement of the most significant one of said partitions and from a binary representation of the binary bits in said second binary number of bits corresponding to said most significant one of said partitions, the integer part of the approximation.

10. The system of claim 9 wherein the at least one processing sub-system comprises at least one processing system having a substantially symmetrical architecture and wherein said computer readable code is capable of causing the at least one processing sub-system to perform the approximation in a minimal number of system clock cycle times.

11. The system of claim 10 wherein the first binary number of bits is 16, the partitions are comprised of nibbles, and the shift utilized in obtaining the residual binary output comprises a shift determined by bit 1 and bit 0 of the integer portion of the base 2 logarithm of the binary input.

12. The system of claim 9 wherein the first binary number of bits is 16, the partitions are comprised of nibbles, and the shift utilized in obtaining the residual binary output comprises a shift determined by bit 1 and bit 0 of the integer portion of the base 2 logarithm of the binary input.

13. The system of claim 8 wherein the first binary number of bits is 16, the partitions are comprised of nibbles, and the shift utilized in obtaining the residual binary output comprises a shift determined by bit 1 and bit 0 of the integer portion of the base 2 logarithm of the binary input.

* * * * *